(No Model.)

D. R. DIX.
BUTTER MOLD.

No. 586,530. Patented July 13, 1897.

WITNESSES:
E. B. Bolton
E. K. Sturtevant

INVENTOR
Dwight R. Dix,
BY
ATTORNEYS

UNITED STATES PATENT OFFICE.

DWIGHT R. DIX, OF EAU CLAIRE, WISCONSIN, ASSIGNOR, BY MESNE ASSIGNMENTS, TO MARTHA R. DIX, W. F. BAILEY, AND BRUCE BROWN, OF SAME PLACE.

BUTTER-MOLD.

SPECIFICATION forming part of Letters Patent No. 586,530, dated July 13, 1897.

Application filed June 26, 1895. Serial No. 554,113. (No model.)

*To all whom it may concern:*

Be it known that I, DWIGHT R. DIX, a citizen of the United States, residing at Eau Claire, county of Eau Claire, and State of Wisconsin, have invented certain new and useful Improvements in Butter and Lard Molding Machines, of which the following is a full, clear, and exact specification.

Figure 1:
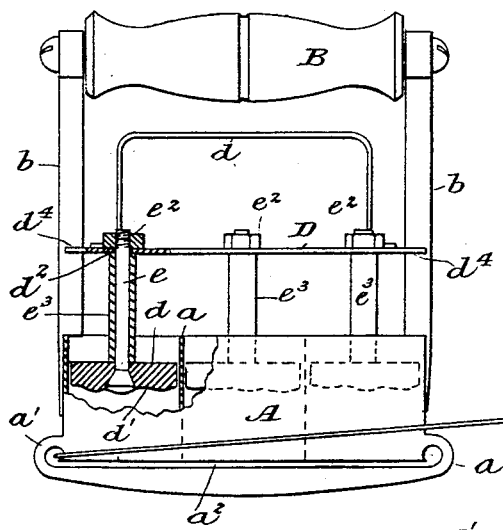
Figure 3:
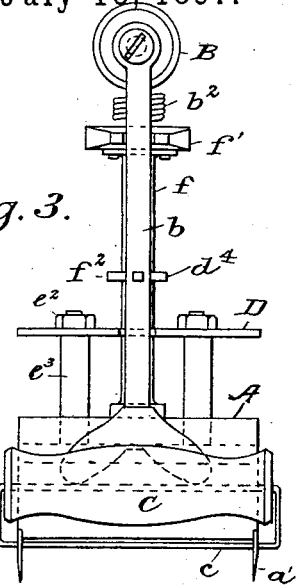
Figure 4:
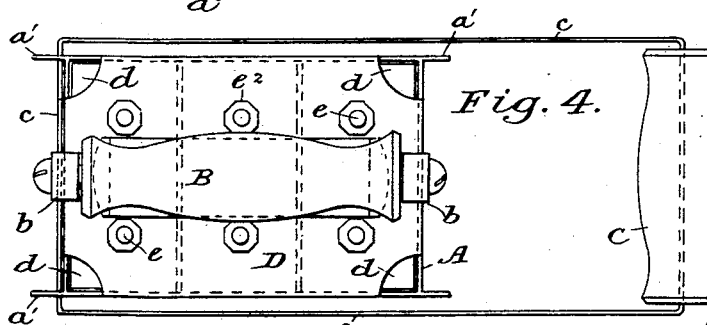
Figure 5:
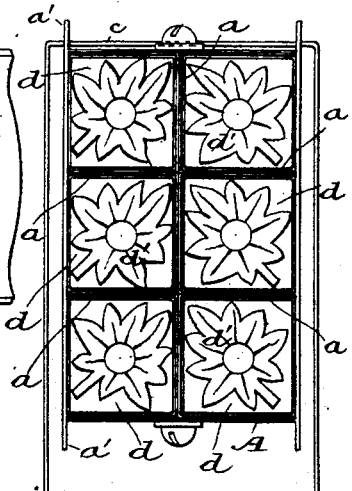
Figure 2:
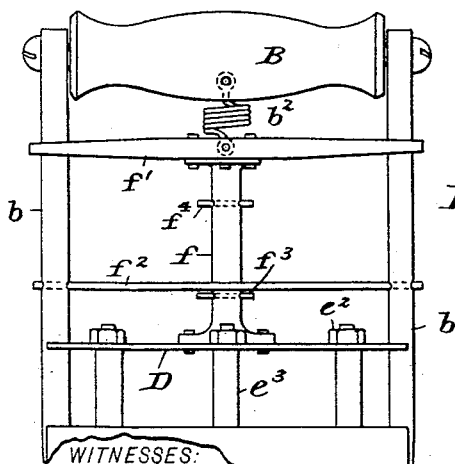

Referring to the drawings which form a part of this specification and in which similar letters of reference refer to similar parts wherever they occur, Figure 1 is a side elevation of my invention. Fig. 2 is a similar view showing several modifications therein. Fig. 3 is an end elevation of the mold shown in Fig. 2, the wire cutter and handle being removed. Figs. 4 and 5 are respectively plan views of the top and bottom of the mold.

A represents a suitable box-like mold which is preferably divided into a plurality of smaller molds of any desired shape by partitions $a$. The lower edges of the sides of the mold and of the partitions are sharpened to facilitate cutting the butter.

B is a handle fixed to the mold by uprights $b\ b$, and C is a handle by means of which the cut-off wire $c$ is operated, as will be hereinafter described.

Projecting lips $a'\ a'$ are formed on each side of the bottom of the mold, projecting a short distance beyond the ends thereof, and the lower edges of the lips are sharpened for cutting the butter. A slot $a^2$ is cut in each lip $a'$ and extends along the bottom of the mold parallel thereto. The cutting-wire $c$ passes through each of the slots $a^2$ and lies across the bottom of the mold, as shown in Figs. 1 and 2 of the drawings, its end being turned up and fastened to the handle C, forming a loop large enough to pass over the mold and its handle B. By drawing the handle C back and forth the wire $c$ is drawn along the bottom of the mold transversely thereto, cutting the butter. At one end of the mold the slots are enlarged or cut away to form a shoulder against which the wire may rest when in the enlarged portion. In this manner the wire is held at one end of the mold when not in use.

The plate D, having fixed thereto a handle, is provided with cut-away portions forming arms $d^4$, which partly embrace the uprights $b$, forming guides. The plate D engages with the uprights $b$, which are secured to the sides of the mold A, whereby the plate D is raised and lowered between the handle B and the mold A, the plate being guided by uprights $b$ and maintaining its horizontal position at all times. The top of each mold or apartment is closed by a plunger $d$, having a face $d'$, which carries a suitable design to be imprinted on the top of the butter-pat. The plungers are each screwed to the plate D by a plunger-stem $e$, which passes through a hole $d^2$ in the plate D, directly over the compartment in which the plunger is located, and the end of the plunger is provided with a screw-thread, whereby it may be held in place by means of a nut $e^2$. The depth of the compartment ordinarily regulates the size of the butter-pat desired, but I have found it more convenient to regulate the height of the butter-pat by means of a sleeve $e^3$, which surrounds the plunger-stem $e$ and is larger in diameter than the hole in the plate D. When this sleeve is placed over the stem, between the face of the plunger and the plate D, the length of the sleeve regulates the height of the top of the mold. When the plate is held in its raised position, as shown in Fig. 1, the plunger-faces close the tops of the molds.

In the modification shown in Fig. 2 the handle is replaced by an upright bar $f$, fixed at its lower end to the plate D and at its upper end to an upright cross-bar $f'$, the ends of which rest against the uprights $b\ b$ in the same manner as does the plate D, the uprights $b\ b$ serving as guides for the cross-bar $f'$. The cross-bar is of suitable shape to be grasped by the hand and serves as a handle for raising and lowering the plate D. A guide-bar $f^2$, permanently attached to the uprights $b\ b$ at a convenient distance above the plate, rests against the upright bar $f$, not so closely, however, as to prevent the latter from sliding up and down against the guide-bar. A stud $f^3$ is fixed to the bar $f$ in such a position below the guide-bar that when the plungers are in their raised position the further raising of the plungers will be prevented by reason of the stud $f^3$ striking against the under side of the guide-bar. A similar stud $f^4$ is fixed to the upright bar above the guide-bar in such a position that when the plungers are in their lowest position the stud will rest against the upper side of the guide-bar. A spring $b^2$, having its ends attached, respectively, to handle B and cross-bar $f'$, normally holds the plate D in its raised position.

In operation the cutting-wire $c$ is drawn to one end of the mold the plate D being held in its raised position. The mold is then grasped by the handle B and pressed into a body of butter, the sharpened edges of the bottom of the molds and the lips $a'$ cutting into the butter. Before the mold is raised the wire $c$ is drawn by means of handle C across the bottom of the mold, thereby cutting the butter in the mold from that outside of the same. The mold is then raised from the body of the butter by means of handle B, after which plate D is pushed downward by means of the handle $d$ or the cross-bar $f'$, causing the plungers to press the small pats of butter out of each mold or compartment. This operation is repeated until the desired number of pats has been made.

The operation of the mold will be facilitated by slightly warming it or dipping it into cold water frequently during its use. It is obvious that the plungers may be provided with any suitable design for the top of the pat and that the plungers may readily be changed without inconvenience.

Although I have described my invention herein as a butter-mold, it is to be understood that it may be used in molding any other material without departing from the spirit of the invention.

I claim—

1. In combination, the mold-box, the plunger with operating means therefor, said box having slots extending from side to side in the opposite walls thereof, and beyond the walls of the mold-box and in the plane of the bottom of said mold-box, and a wire cutter of rectangular form arranged in said slots and adapted to be drawn from end to end of the slots, the slots being straight parallel with the face of the mold-plungers and being closed at both ends forming the sole connection between the cutter and the mold-box, substantially as described.

2. In combination, the mold-box, the plunger with its stem, the side standards, the cross-plate guided thereby, the main handle, the supplemental handle $f'$ with its stem $f$, the fixed bar $f^2$ through which the stem $f$ passes and the stops $f^3\,f^4$ on said stem, substantially as described.

In witness whereof I have hereunto set my hand in presence of two witnesses.

DWIGHT R. DIX.

Witnesses:
J. F. ELLIS,
MARTHA SCHWAHN.